United States Patent [19]

Smith et al.

[11] 4,356,061
[45] Oct. 26, 1982

[54] GAMMA THERMOMETER HAVING COMBINED THERMAL BRIDGE AND CENTERING MEANS

[75] Inventors: Robert D. Smith, Bethesda, Md.; Pierre Regazzoni, Boulogne-Billancourt, France

[73] Assignee: Scandpower, Inc., Bethesda, Md.

[21] Appl. No.: 48,033

[22] Filed: Jun. 13, 1979

[51] Int. Cl.³ .............................................. G21C 17/00
[52] U.S. Cl. ..................................... 376/254; 374/134
[58] Field of Search ............. 176/19 R; 136/211, 212, 136/229, 233; 73/1 F, 15 B, 359 R, 361; 250/390–393, 336, 395; 136/224–227, 230, 232

[56] References Cited

U.S. PATENT DOCUMENTS

| | | | |
|---|---|---|---|
| 3,028,494 | 4/1962 | Wickersham et al. | 250/390 |
| 3,110,657 | 10/1963 | Rault | 176/19 R |
| 3,132,077 | 5/1964 | Turovlin | 176/19 R |
| 3,444,373 | 5/1969 | Obrowski et al. | 176/19 R |
| 3,716,417 | 2/1973 | Evans | 176/232 |
| 3,716,450 | 2/1973 | Lions | 176/19 R |
| 3,751,333 | 8/1973 | Drummond et al. | 176/19 R |
| 4,106,983 | 8/1978 | Meuschke et al. | 176/19 R |

FOREIGN PATENT DOCUMENTS 2385187 10/1978 France ........................... 176/19 R

OTHER PUBLICATIONS

Gamma Thermometer Developments for LWR Leyse et al., 10/78.
Review of Sci. Ins., vol. 29, No. 9, (9/58), Myers, pp. 758–765.

Primary Examiner—Sal Cangialosi
Attorney, Agent, or Firm—Eric P. Schellin

[57] ABSTRACT

A gamma thermometer is supported coaxially in a bore, extending through the core of a nuclear reactor, by spring means which span the annular space between the gamma thermometer and the bore. Said spring means acts, in addition, as a thermal bridge, so that the portion of the gamma thermometer contacted by the spring means will assume a thermal temperature close to that of the bore. Since poor thermal contact between the gamma thermometer and the bore is therefore avoided, the accuracy of readings is improved.

10 Claims, 10 Drawing Figures

GAMMA THERMOMETER HAVING COMBINED THERMAL BRIDGE AND CENTERING MEANS

RELATED APPLICATION

This application is related to the following application:

U.S. Patent Application of Erik Rolstad, Ser. No. 888,881, APPARATUS FOR DETERMINING THE LOCAL POWER GENERATION IN A NUCLEAR REACTOR FUEL ASSEMBLY.

SUMMARY AND BACKGROUND OF INVENTION

Gamma thermometers, such as are used to measure the heat rate of nuclear reactors, depend upon the heating of a thermally isolated mass of metal by gamma rays (approximately 90%) and high energy neutrons (approximately 10%). The heat so generated is proportional to the specific power of the nearby fuel rods. Heat generated in the mass of metal is permitted to escape to a sink only through a controlled heat path of closely held dimensions. The temperature drop along that heat path is directly proportional to heat rate (watts/gm) in the heater and therefore proportional to power, not neutron flux, in adjoining fuel rods. A thermocouple, or thermocouples, arranged to measure the temperature drop along the controlled heat path produces a signal proportional to this power. This temperature drop and the signal are not greatly affected by the temperature of the heat sink. However, when the temperature of the heat sink changes by a considerable amount, say 50° C., then there is a corresponding and noticeable second order change in the thermal conductivity of the controlled heat path, which is reflected as a change in the temperature drop and as an error in the signal output; even though the gamma ray flux is constant.

The gamma thermometer of the Rolstad et al application, identified above, gives very accurate measurements when the bore into which it is inserted is that of a unfueled fuel guide tube of a nuclear reactor. Since reactor coolant circulates rapidly through such a fuel tube, it follows that the outer sheath of the Rolstad et al application will have a fairly well defined temperature. The readings of the gamma thermometer will therefore be accurate enough, or can accurately be corrected to take care of the second order change in thermal conductivity of the heat path discussed above, for changes in the temperature of the outer sheath of the gamma thermometer, which outer sheath acts as a heat sink.

However, when the gamma thermometer of the Rolstad et al application is inserted into a dry bore extending through the core of a nuclear reactor, the outer sheath of the reactor may assume an ununiform temperature, depending upon whether the portion of the outer sheath in question touches or does not touch the bore. Those portions of the outer sheath which touch the bore will be kept cool by the contact, while those portions which bridge the bore will heat up from the gamma ray flux.

In the present invention a spring means spans the annular gap between the gamma thermometer and the bore into which it is inserted. The spring means has the dual function of providing a thermal bridge at the correct spot on the gamma thermometer for a heatsink and of providing a centering means for the gamma thermometer in the bore into which it is inserted. Several different embodiments are disclosed below.

VIEWS OF DRAWING

FIG. 1A is a longitudinal cross section of one type of prior art in-place gamma thermometer, and is representative of that type, while

FIG. 2 is a longitudinal cross section of a gamma thermometer in a bore, characterized by the use of a piston-ring and spring wiper type of thermal bridge and centering means while

FIG. 3 is a longitudinal cross section of a gamma thermometer in a bore, characterized by the use of a undulating ribbon spring type of thermal bridge and centering means, while

Figure 5A:
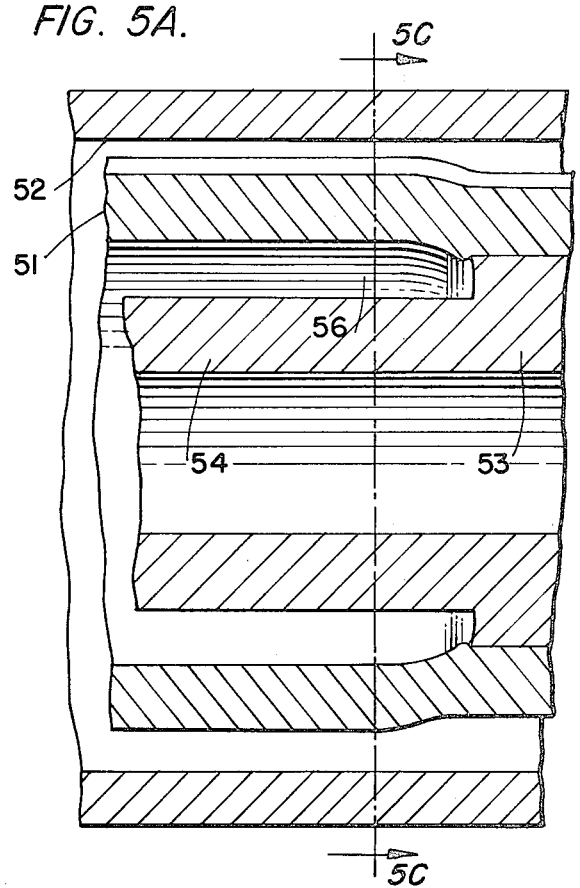
Figure 5B:
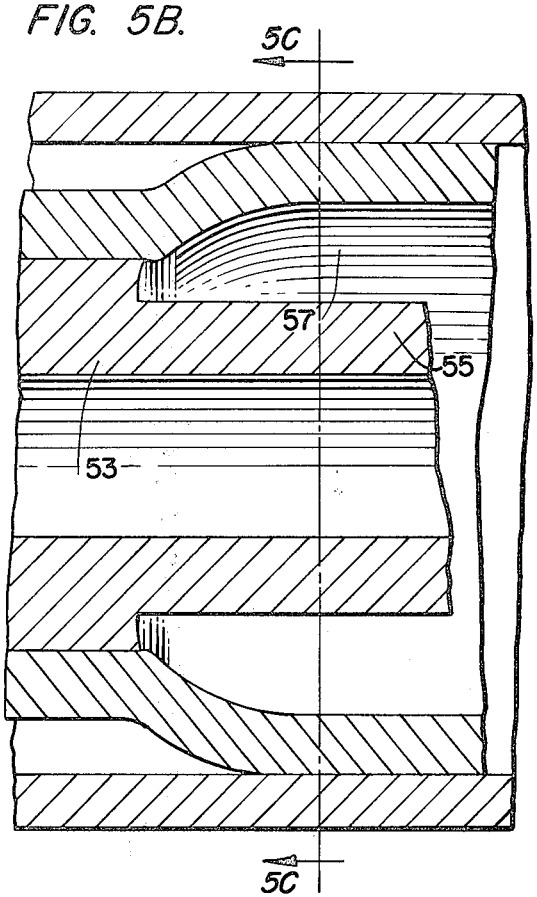

FIG. 5A and FIG. 5B are longitudinal cross sectional views, the planes of which are at about 30 degree angles to each other, of two longitudinally spaced but adjacent portions of a gamma thermometer in an instrument tube, characterized by the fact that the sheath of the gamma thermometer is elliptical and acts both as a thermal bridge and as a centering means. Said two longitudinal sections are indicated at 6A and 6B of FIG. 6C. Said FIG. 6C is a transverse cross section of said longitudinally spaced portions, as indicated at 6C of FIGS. 6A and 6B.

DETAILED DESCRIPTION

Figure 1A:
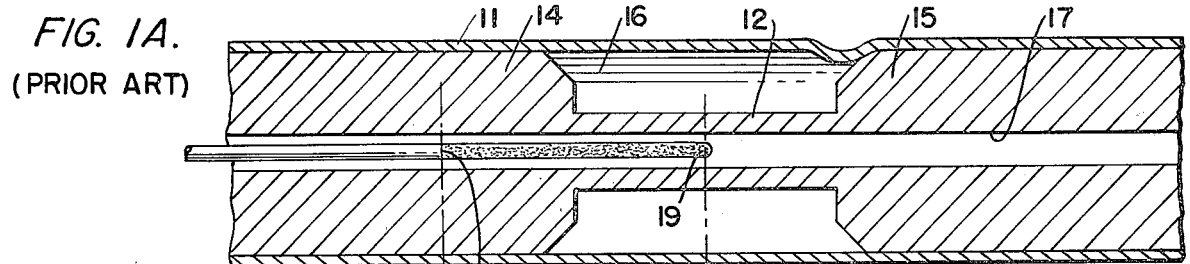

FIG. 1A illustrates a typical gamma thermometer as disclosed in the above identified Rolstad et al application.

Within the outer sheath 11 there is a smaller mass of metal, 12 (consisting of a thin walled tube) which is joined at each end by two larger masses of metal, 14 and 15 (consisting of thick walled tubes).

Under the influence of an ambient gamma ray flux, the masses of metal 12, 14 and 15 will all be heated. The heat in masses 14 and 15 can escape radially outward, to sheath 11, and then to the ambient surround, such as flowing reactor coolant or the dry bore of an instrument tube. However, the heat generated in the mass of metal 12 can not escape radially outward, since the empty space 16 acts as thermal insulation, but must escape by flowing longitudinally through 12 and then radially through 14 and 15. Accordingly, mass 12 gets hotter than masses 14 and 15. A temperature plot taken along the axis of bore 17, when the sheath 11 is uniformly cooled to a constant temperature, would have the characteristic indicated by graph 18 of FIG. 1B. The temperatures of the hot spot and a cooler sport are sensed by a differential thermocouple with hot junction 19 and cold junction 20, and the electrical output, directly dependent on the thermal gradient, is a measure of the gamma ray flux.

The sheath 11 would be uniformly cooled to a known temperature if surrounded on all sides with flowing reactor coolant, but if the gamma thermometer is inserted into a dry instrument tube, some parts of the sheath will bridge across portions of the instrument tube and make poor thermal contact with the instrument well.

Figure 1B:
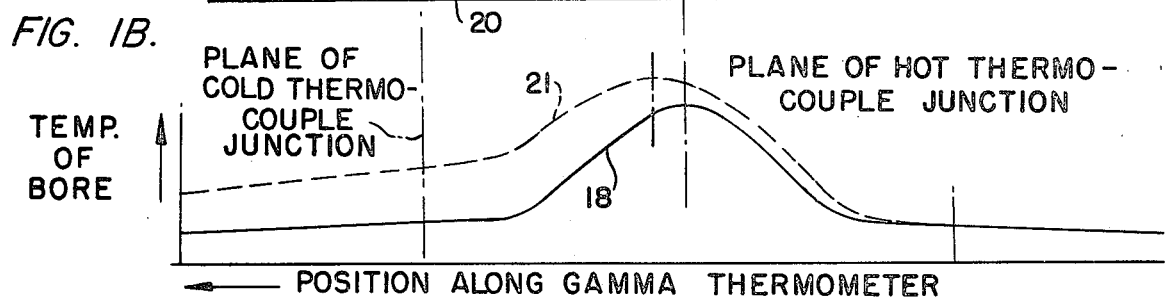
FIG. 1B is a graph showing the temperature distribution along such an in-place gamma thermometer for a normal, desired symmetrical distribution and for an undesired unsymmetrical distribution, which occurs when there is unsymmetrical cooling.

For example, if the portion of the sheath 11 over mass 14 is in poor thermal contact with the tube, the temperature plot, taken along the axis of the gamma thermometer of FIG. 1A, for the same gamma ray flux as before, is shown as the dotted line graph 21 of FIG. 1B. It will be seen that the graph is not symmetrical, and that the indicated temperature difference is incorrect and that the hot spot is no longer at thermocouple junction 19.

In accordance with the invention, means are provided, adjacent the cold junction, to avoid poor thermal contact between sheath and instrument tube.

Figure 2:
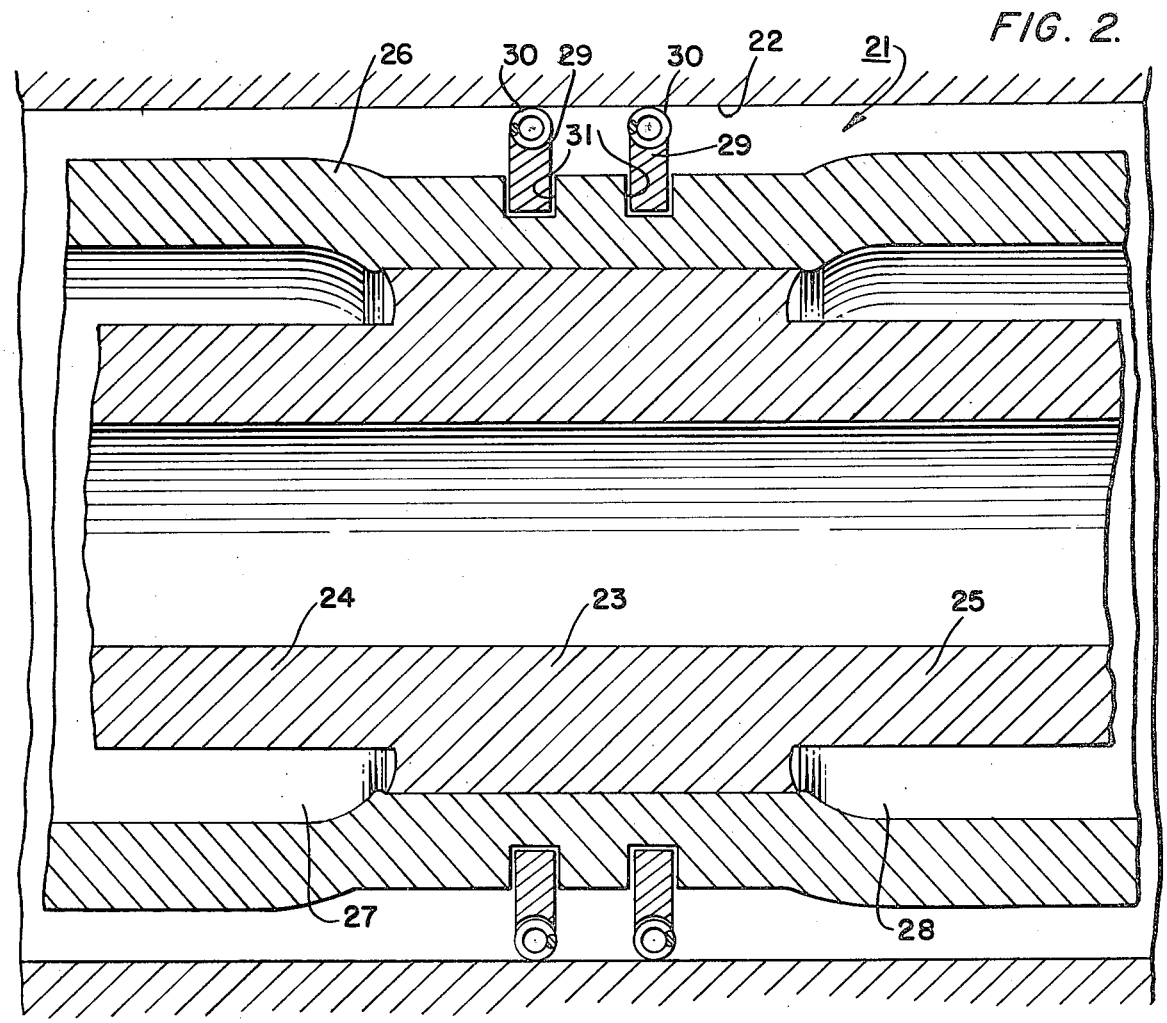

The longitudinal cross section of FIG. 2 illustrates a gamma thermometer of the Rolstad et al type equipped with means to ensure good thermal contact with the bore in which it is inserted.

The gamma thermometer 21 is inserted into bore 22. The gamma thermometer 21 has a larger mass of metal 23 and smaller masses of metal 24, 25. A sheath 26 is roll swagged into good contact with the larger mass of metal 23, but remains separated from the smaller masses 24 and 25, thereby providing the spaces 27, 28, which act as thermal insulation for the smaller masses 24 and 25. Thus, under the action of an ambient gamma flux, the smaller masses 24 and 25 will become hotter than the larger mass 23.

Figure 2A:
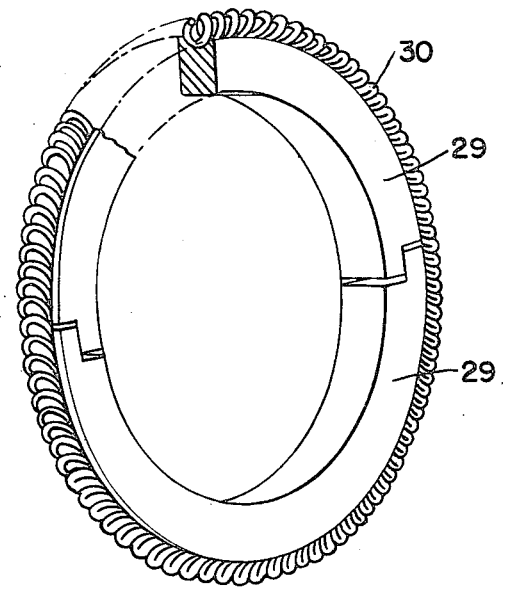
FIG. 2A is a perspective view of the thermal bridge and centering means per se.

In order to keep the temperature of the larger mass 23 close to that of bore 22, D rings 29 and spring 30 are provided. The structure of the D rings 29 and 30 is illustrated in the perspective of FIG. 2A. The fact that the two D rings 29 are separable permits them to be inserted into the machined grooves 31 of FIG. 2 in touching contact with each other. The spring 30, made of a helix with the two ends hooked together, is then stretched over the circumferential groove about the exterior edge of the D rings. The attrahent bias of spring 30 holds the D rings in place. The springiness of the individual turns of spring 30 permits these turns to conform to the shape and diameter of bore 22 over any foreseeable variation in bore size.

Since the area of groove 31 is large, and since the turns of spring 30 press tightly against D rings 29 and bore 22, the thermal resistance between sheath 26 and bore 22 is considerably decreased, compared to that between a bore and a sheath loosely lying within.

Furthermore, if the bore is a wet bore, flow of reactor coolant therealong is not significantly hindered, since the fluid can flow along the bore by passing between successive turns of the helix constituting spring 30.

Figure 3A:
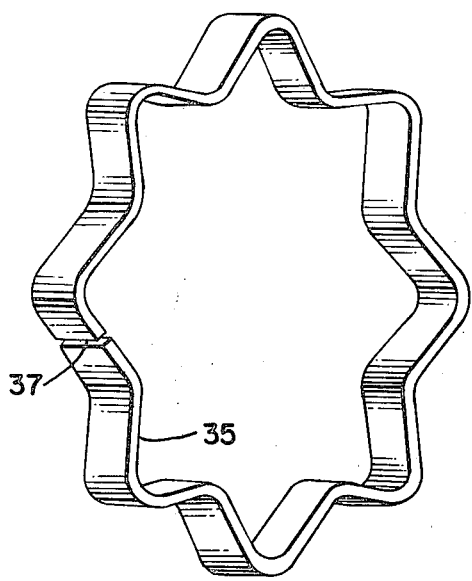
FIG. 3A is a perspective view of the thermal bridge and centering means per se.
Figure 3:
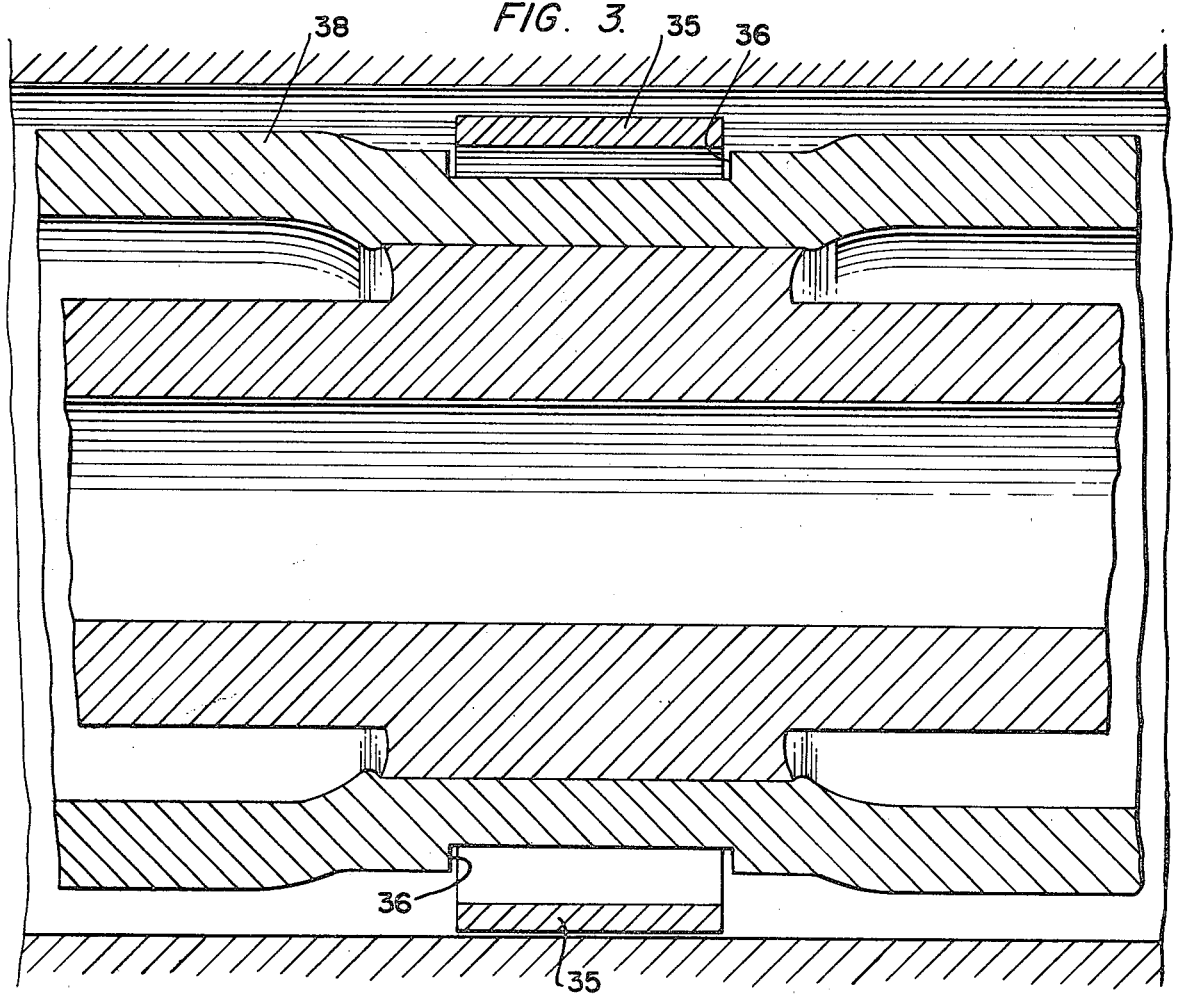

FIG. 3 illustrates an embodiment of the invention in which a ribbon spring 35 (better seen in FIG. 3A) is snapped into groove 36. The ribbon spring 35 is provided with a split 37 so that it can be spread over the larger diameter of sheath 38. In other respects the gamma thermometer of FIG. 3 is similar to that of FIG. 2.

While the thermal resistance of the thermal bridge of FIG. 3A is somewhat higher than that of FIG. 2A, it is adequate for many applications and simpler in construction. The ribbon spring 35 will not obstruct the longitudinal flow of reactor coolant.

Figure 4:
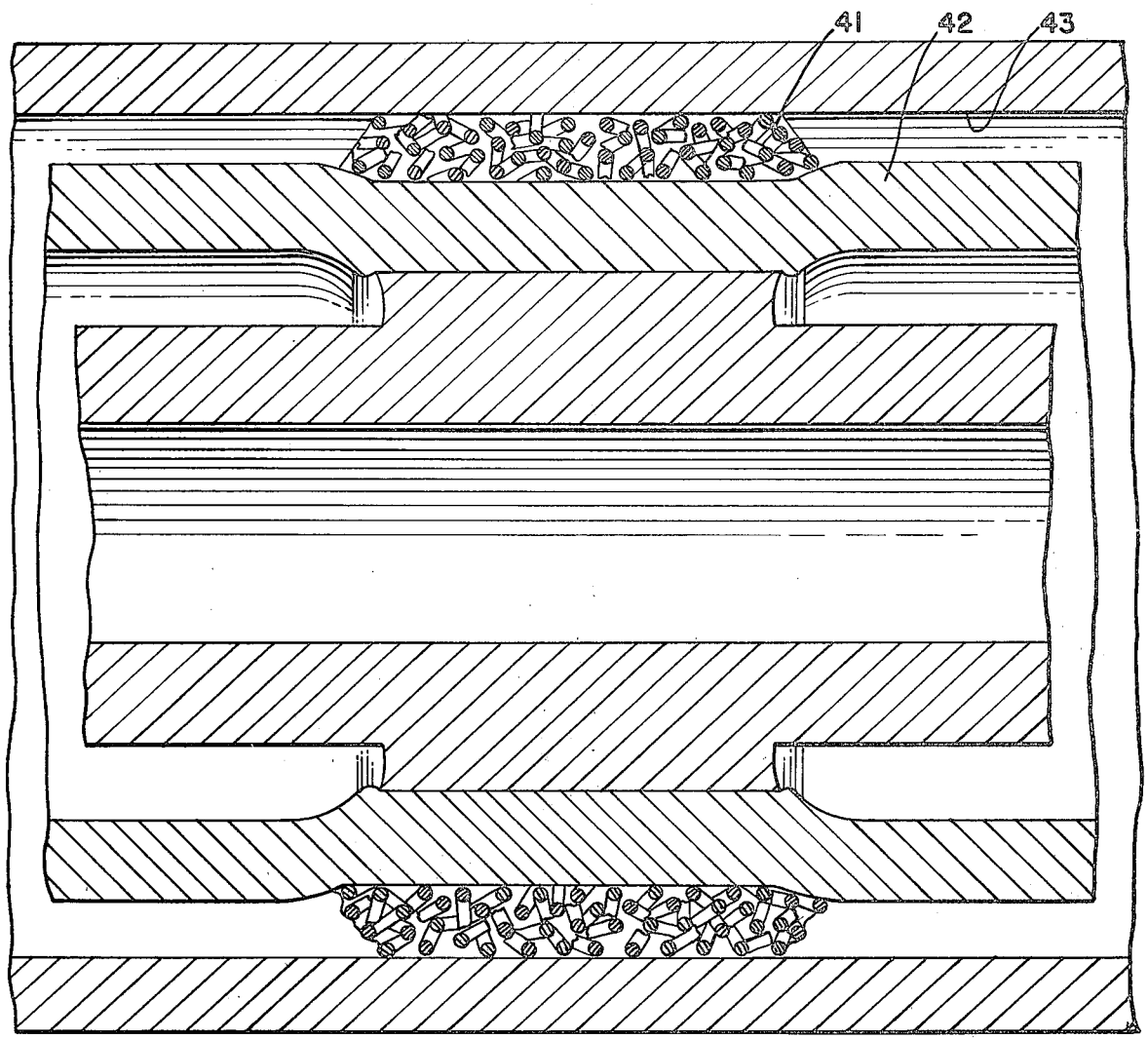
FIG. 4 is a longitudinal cross section of a gamma thermometer in an instrument tube, characterized by a thermal bridge and centering means consisting of demister material.

FIG. 4 illustrates another embodiment. Here the thermal bridge is made of a springy mass 41 of tubular knitted fabric of very fine stainless steel wire. The knitted tube is collapsed to 30% density, thereby forming a sponge like sleeve, similar to those used to demist compressed gases. The sponge like sleeve is slipped over the sheath 42 of the gamma thermometer and welded into place. In order to facilitate resistance welding of the metal sponge to the sheath, it is well to serate the sheath sharply with the rollers during the roll swagging process, for it is easier to weld the sponge to a projecting edge than to a flat surface.

The springy mass 41 will reduce the thermal resistance between sheath 42 and bore 43 and will also permit longitudinal flow of reactor coolant.

The embodiment of FIG. 4 has the obvious advantage that the thermal bridge is fixed to a gamma thermometer.

FIG. 5A illustrates another embodiment which provides for good thermal contact between sheath 51 and bore 52 and which provides for good centering of sheath 51 within bore 52 and which permits longitudinal flow of reactor coolant.

As in the other embodiments, the sheath 51 is roll swagged down into hard contact with the larger mass 53. Since the sheath 51 provides cooling, the larger mass 53 will not heat up as much as the smaller masses 54, 55.

At the protion of the sheath 51 opposite the smaller masses 54 and 55, the sheath is die swagged to change its original cylindrical shape into that of an ellipsoid, the major exterior dimension of which is a sliding fit in bore 52 and the minor interior dimension of which clears the exterior diameter of the smaller masses 54, 55.

During the die swagging operation the original cylindrical sheath 51 is squeezed by opposed swage blocks to produce the minor axis dimension. As one diameter is reduced, the sheath 51 bulges along the perpendicular diameter to produce the major axis dimension, which is monitored so that a proper degree of distortion is obtained to achieve a sliding fit between sheath 51 and the bore 52. It is to be noted that the plane of swagging, as desired, may always be constant or it may corkscrew along the axis of the sheath.

Figure 5C:
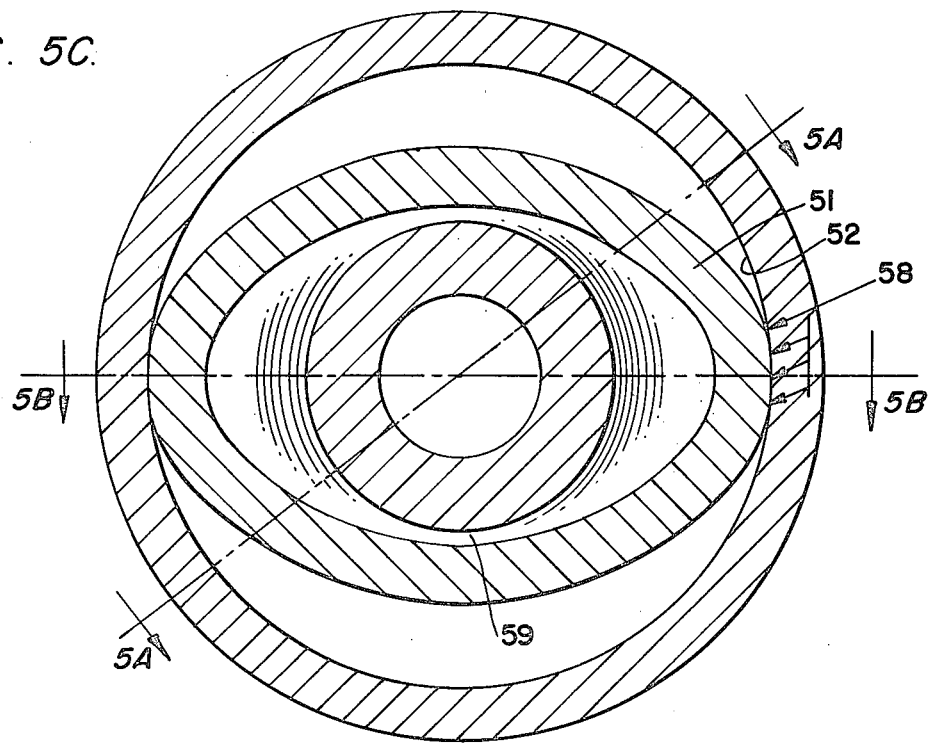

Because of the sliding fit, there is good thermal contact between the sheath 51 and bore 52. At the same time, the insulation between the sheath 51 and smaller masses 54, 55 supplied by the spaces 56 and 57 is not destroyed. The good contact is indicated by the arrows 58 of FIG. 5C while the clearance is indicated by legend 59.

It will be apparent that the thermal bridge supplied by this form of construction is very rugged.

The thermal bridges and centering means described herein are useful not only in combination with the Rolstad et al type gamma thermometers, which are generally used while fixed in place, but are also useful with the Smith type traveling gamma thermometers, which are generally used for scanning operations.

We claim:

1. For use with a gamma sensor positioned within a tubular guide of a fuel assembly in a nuclear reactor, said sensor having an elongated gamma heated body having axially spaced reduced diameter portions and provided with relatively hot and cold regions said hot regions being located at said reduced diameter portions, said reduced diameter portion providing heat flow in substantially the axial direction, and an outer sheath in thermal contact with said body along the cold region thereof to establish axially symmetrical heat distribution therein in response to uniform external cooling of the outer sheath within an annular gap between said outer sheath and the tubular guide, the improvement residing in thermal bridge means engageable with the tubular guide within the annular gap for establishing thermal contact between the outer sheath and the tubular guide, and means mounting the thermal bridge means on the outer sheath in axially spaced adjacency to the hot region of the body for preventing disturbance of said symmetrical heat distribution by poor thermal contact in said gap between the outer sheath and the tubular guide.

2. The improvement as defined in claim 1 wherein said thermal bridge means includes a centering element in sliding contact with the tubular guide.

3. The improvement as defined in claim 2 wherein said thermal bridge means further includes at least two separable ring sections on which the centering element is supported.

4. The improvement as defined in claim 3 wherein said centering element is a helical spring.

5. The improvement as defined in claim 4 wherein said mounting means includes an annular groove formed in the outer sheath within which the ring sections are seated.

6. The improvement as defined in claim 1 wherein said mounting means includes an annular groove formed in the outer sheath within which the centering element is seated.

7. The improvement as defined in claim 6 wherein said centering element is a split, undulating ribbon spring.

8. The improvement as defined in claim 2 wherein said centering element is a metal wire fabric.

9. For use with a gamma sensor positioned within a tubular guide of a fuel assembly in a nuclear reactor, said sensor having an elongated gamma heated body having axially spaced reduced diameter portions and provided with relatively hot and cold regions said hot regions being located at said reduced diameter portions, said reduced diameter portions providing heat flow in substantially the axial direction, and an outer sheath in thermal contact with said body along the cold region thereof to establish axially symmetrical heat distribution therein in response to uniform external cooling of the outer sheath within an annular gap between said outer sheath and the tubular guide, the improvement residing in thermal bridge means engageable with the tubular guide within the annular gap for establishing thermal contact between the outer sheath and the tubular guide, said thermal bridge means being formed by portions of the outer sheath radially deformed into ellipsoidal shape at a location in axially spaced adjacency to the hot region of the body for preventing disturbance of said symmetrical heat distribution by poor thermal contact in said gap between the outer sheath and the tubular guide.

10. For use with a gamma sensor positioned within a tubular guide of a fuel assembly in a nuclear reactor, said sensor having an elongated gamma heated body having axially spaced reduced diameter portions and provided with relatively hot and cold regions said hot regions being located at said reduced diameter portions, said reduced diameter portions providing heat flow in substantially the axial direction, and an outer sheath in thermal contact with said body along the cold region thereof to establish axially symmetrical heat distribution therein in response to uniform external cooling of the outer sheath within an annular gap between said outer sheath and the tubular guide, the improvement residing in centering means projecting from the outer sheath through the gap into sliding contact with the tubular guide from an axial location on the body in spaced adjacency to the hot region.

* * * * *